United States Patent
McCowan et al.

[11] Patent Number: 5,855,192
[45] Date of Patent: Jan. 5, 1999

[54] CHARGE CONDITIONING SYSTEM FOR ENABLING COLD STARTING AND RUNNING OF SPARK-IGNITED, DIESEL FUELED PISTON ENGINES

[75] Inventors: William P. McCowan, Queenstown; Brad R. Bopp, Chester; Andrew A. Pouring, Edgewater; Peter Y. Mills, Chester, all of Md.

[73] Assignee: Sonex Research, Inc., Annapolis, Md.

[21] Appl. No.: 840,710

[22] Filed: Apr. 25, 1997

Related U.S. Application Data

[63] Continuation of Ser. No. 314,711, Sep. 29, 1994, abandoned.
[51] Int. Cl.⁶ ........................................................ F02B 19/12
[52] U.S. Cl. ........................................ 123/179.21; 123/557
[58] Field of Search ............................... 123/179.21, 549, 123/557, 543, 545, 546, 547, 253, 254, 255, 259, 281, 283, 251, 285, 193.6

[56] References Cited

U.S. PATENT DOCUMENTS

| | | |
|---|---|---|
| 1,178,717 | 2/1916 | Kent . |
| 4,128,092 | 12/1978 | Yokota et al. . |
| 4,278,884 | 7/1981 | Waschkuttis . |
| 4,280,488 | 7/1981 | Millmen . |
| 4,350,134 | 9/1982 | Sparks . |
| 4,359,025 | 11/1982 | Zeliszkewycz . |
| 4,395,998 | 8/1983 | Chou . |
| 4,426,962 | 1/1984 | Otani et al. . |
| 4,433,660 | 2/1984 | Blaser . |
| 4,448,175 | 5/1984 | Darvial et al. . |
| 4,503,812 | 3/1985 | Eberhardt . |
| 4,534,333 | 8/1985 | Slattery . |
| 4,546,752 | 10/1985 | Blaser et al. . |
| 4,607,153 | 8/1986 | Ang et al. ........................ 123/179.21 |
| 4,742,209 | 5/1988 | Minegishi et al. . |
| 4,770,138 | 9/1988 | Newman . |
| 4,788,942 | 12/1988 | Pouring et al. . |
| 4,896,636 | 1/1990 | Pfefferle . |
| 4,913,111 | 4/1990 | Ariga . |
| 4,926,831 | 5/1990 | Earl . |
| 5,010,870 | 4/1991 | Laskaris et al. . |
| 5,050,571 | 9/1991 | Daniels . |
| 5,054,458 | 10/1991 | Reimer et al. . |
| 5,159,915 | 11/1992 | Saito et al. . |
| 5,307,780 | 5/1994 | Dodge . |
| 5,322,042 | 6/1994 | De Priolo et al. ................... 123/193.6 |
| 5,367,994 | 11/1994 | Hinkle . |
| 5,529,035 | 6/1996 | Hunt et al. ......................... 123/179.21 |

FOREIGN PATENT DOCUMENTS

| | | |
|---|---|---|
| 905 902 | 3/1954 | Germany . |
| 929 884 | 7/1955 | Germany . |

*Primary Examiner*—Marguerite McMahon
*Attorney, Agent, or Firm*—Bacon & Thomas

[57] ABSTRACT

A spark ignited, piston type diesel fueled internal combustion engine is provided with a charge conditioning system that includes a fuel preheater for vaporizing liquid fuel to enable starting of the engine and a least one secondary heater for adding additional heat to the charge supplied to the engine. The fuel vaporizer receives liquid fuel from the starting fuel circuit of the engine and uses an electrically or chemically energized heater device, or a direct combustion heater. The secondary heater may be associated with the charge intake conduit of the engine or with the combustion chamber of the engine. The secondary heater device may be electrically or chemically activated, or may constitute a heat regenerator that retains heat from a previous combustion cycle of the engine. Spark plug fouling is avoided by utilizing secondary chambers adjacent the combustion chamber of the engine that direct expanding jets of high velocity gases towards the spark plug electrodes each combustion cycle during the power stroke of the piston.

10 Claims, 5 Drawing Sheets

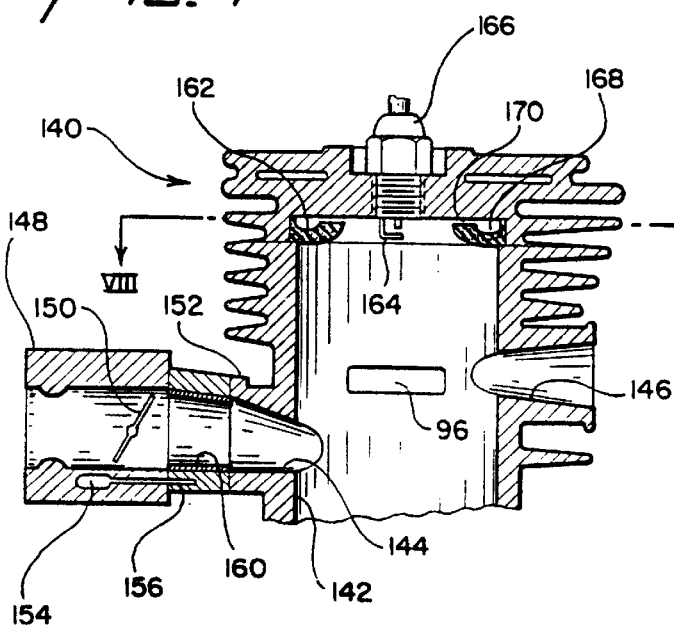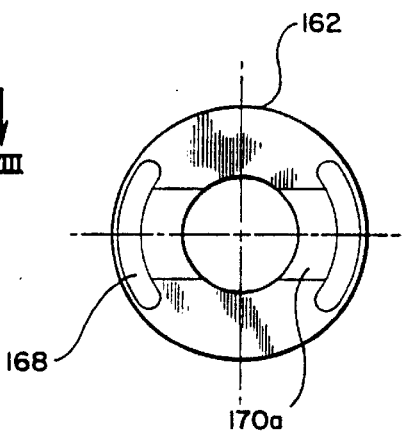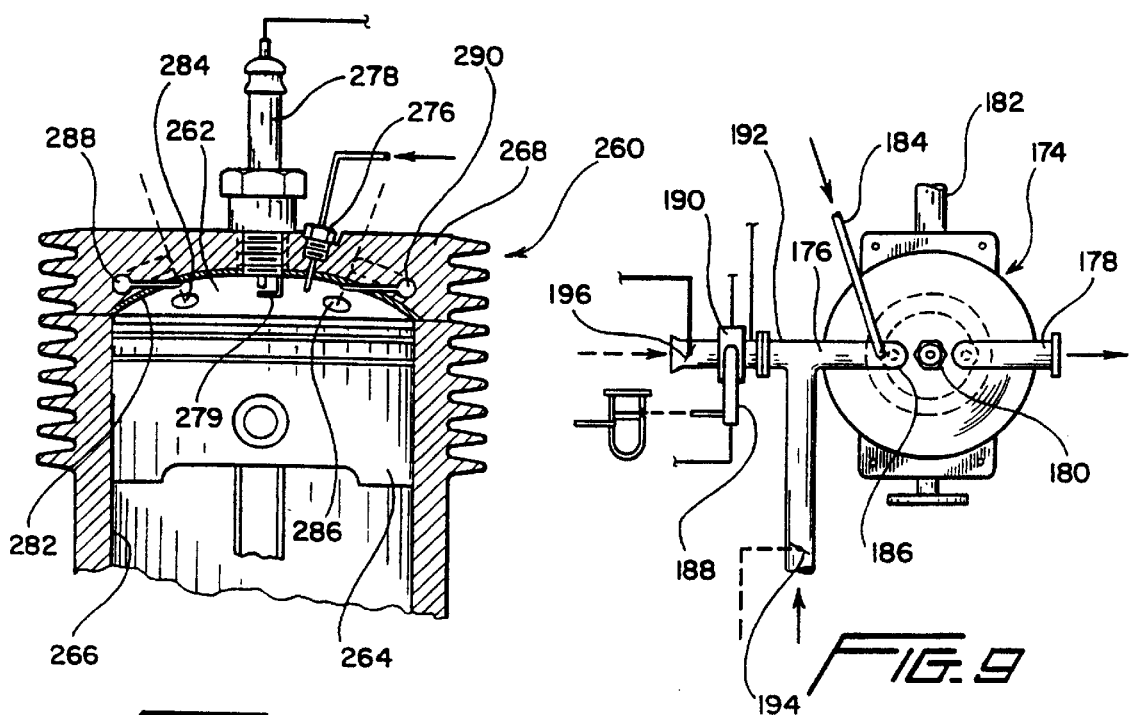

dure
CHARGE CONDITIONING SYSTEM FOR ENABLING COLD STARTING AND RUNNING OF SPARK-IGNITED, DIESEL FUELED PISTON ENGINES This application is a Continuation of application Ser. No. 08/314,711, filed Sep. 29, 1994, abandoned.

BACKGROUND OF THE INVENTION

1. Field of the Invention

The invention is concerned with improvements in internal combustion engine technology, in particular spark-ignited, diesel (i.e., kerosene based) fuel burning piston engines.

2. Background of the Invention

It is desirable to use kerosene based fuels, i.e., fuels spanning JP-5 to D-2, instead of gasoline for spark ignited, piston engines under conditions where various type engines are to be used for different applications but only a single fuel is to be supplied and stored for all types of engines. Such conditions would be encountered typically in a military environment which could include the use of aviation jet engines, vehicle engines, fixed or mobile engine generator systems, etc. Under such conditions, it is considered advantageous to be able to use a single type fuel for all engines, in particular diesel type fuel, because a spark ignited 2 or 4 stroke piston engine normally burning gasoline can be converted to run on diesel fuel with minimum alterations to the basic engine being required. Non-military situations could include buses and auxiliary engines, campers and auxiliary engines, and small portable engines used where kerosene fuel is available but not gasoline.

However, two stroke or four stroke cycle spark ignited piston type internal combustion engines intended for use with diesel (i.e., kerosene based) fuels typically require special arrangements for starting the engines under cold ambient conditions, and further, while running, such engines are prone to spark plug fouling and high hydrocarbon (HC) and smoke emissions due to incomplete combustion of the fuel. Glow plugs that are typically used for starting diesel engines may not be relied on unless battery or other electrical power is available to energize the plugs, and even if the use of glow plugs is feasible, the low compression ratio of a spark ignited engine may not produce sufficiently high temperature in the charge to dependably ensure ignition during cold start conditions when a glow plug is used.

While JP-5 and light kerosene fuels flow freely under sub-freezing temperatures, heavier diesel fuels tend to cloud and congeal due to precipitation of waxes contained in such fuels, making the use of heavy diesel fuels problematic under extreme cold conditions. Fuel preheaters of various types have been used in diesel engine fuel supply systems to avoid the cold flow problems associated with such fuels.

Accordingly, there exists a need for a charge conditioning system for spark-ignited, piston-type kerosene based (diesel) fuel burning internal combustion engines that will enable dependable starting of the engine under cold ambient conditions with or without the availability of battery supplied electrical energy and which will ensure clean burning of the fuel without spark plug fouling during engine operation.

The present invention is intended to provide a starting and running system for diesel fueled spark ignited engines that will ensure dependable starting and clean running of such engines even under extreme cold ambient conditions.

SUMMARY OF THE INVENTION

In accordance with the invention as described and claimed below, a spark ignited, piston type, diesel (i.e., kerosene based) fueled internal combustion engine is provided with a charge conditioning system that includes a fuel preheater that preferably vaporizes sufficient liquid fuel at the charge intake of the engine t[ ]o enable dependable starting of the engine. Preferably, a second charge or combustion chamber heating system is used with the fuel vaporizer.

The invention also includes a combustion chamber heat generator arrangement that preserves heat of combustion to facilitate continuous clean ignition and burning of the diesel fuel charges supplied to the engine and a spark plug blowing system that utilizes high speed jets of hot gases to cleanse the spark plug electrodes in the combustion chamber during engine operation.

Various heating systems may be used to implement the invention, but in accordance with further inventive concepts herein described and claimed, such heating systems may utilize a glow plug in heat exchange relationship with fuel drawn from the idle or starting circuit of a carburetor for the engine; a chemical heater that can be manually activated and recycled by heating; an open combustion fuel preheater and vaporizer; an electrical resistance ceramic heater; and a combustion chamber heater in the form of an electrical, chemical or ceramic heater, or a heat regenerator. Various heaters that are described herein may be used individually or in combination with one another in any of the embodiments of the invention.

Various embodiments of starting systems using a charge vaporizer or preheater are described herein, and vary from a simple signal system providing an operator with a timing indication signaling when to start the engine after a predetermined time period has elapsed from initiation of the fuel or charge heating cycle, to a more sophisticated fuel vapor sensing system or programmed starting cycle based on a microprocessor driven controller arranged to automatically engage an electrical startup motor for the engine without manual intervention after the program is initiated.

A detailed written description and illustrations of the invention follows.

BRIEF DESCRIPTION OF THE DRAWINGS

FIG. 7 is a schematic illustration of an alternative embodiment of the invention including a heat retaining element;

FIG. 8 is a plan view of the heat retaining element shown in FIG. 7 taken along line VIII—VIII in FIG. 7;

FIG. 9 is a schematic plan view illustration of another embodiment of the invention usable when the engine is fuel injected;

FIG. 14 illustrates another embodiment of the invention wherein mini-chambers in the head of the engine are provided with a direct injected, spark ignited, two stroke engine.

DETAILED DESCRIPTION

Figure 1:
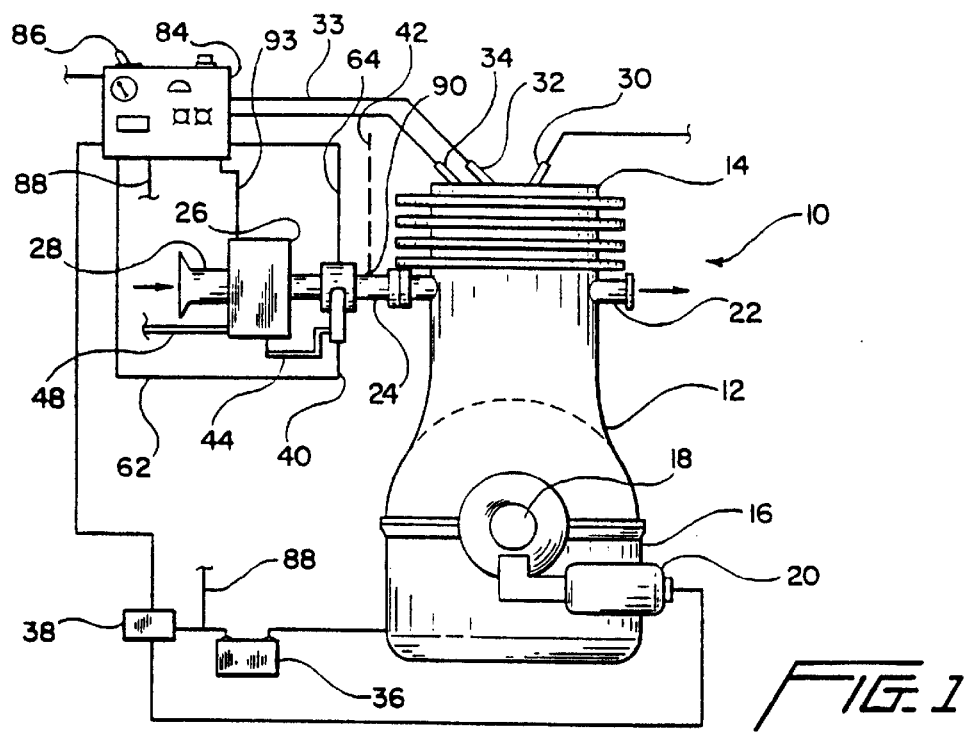
FIG. 1 is a schematic illustration of a piston-type, two stroke spark-ignited internal combustion engine having a fuel vaporizing and charge preheating system embodying the present invention.

With reference to the appended drawings, a reciprocating piston, two stroke cycle, spark ignited single cylinder engine is illustrated at 10 and includes an engine block or housing 12, a cylinder head 14, a crank case 16 and an electrically energized starter motor 20 connected to an appropriate starter gear mechanism (not illustrated) connected to the engine drive shaft 18. The engine 10 also includes an exhaust conduit 22 and an intake conduit 24. A carburetor device 26 is operatively associated with the intake conduit 24 and may be of any conventional configuration that enables preparation of a fuel/air charge that is admitted to the intake conduit 24 upon startup of engine 10. The carburetor 26 includes an air horn 28 and a conventional air throttle valve (not shown in FIG. 1) for regulating the flow of air and fuel through conduit 24 during operation of engine 10. While an electrically operated starter motor 20 is illustrated, a simple manually operated pull cord starting arrangement associated with output shaft 18 or other rotary engine part could be provided for starting purposes.

In the embodiment of the invention illustrated in FIG. 1, engine 10 may also include a spark igniting device 30 attached at the head 14 of engine 10 and extending into the combustion chamber (not illustrated in FIG. 1) of the engine. An electrically energized glow plug 32 may be also be provided for reasons that will be explained in detail below, the glow plug likewise being secured to the head 14 of engine 10 and extending into the combustion chamber of the engine. An engine head temperature sensor 34 is also provided in accordance with the embodiment of the invention illustrated in FIG. 1.

A battery device 36 is shown provided in combination with the engine 10 for energizing the ignition system, the starter motor 20, and other electrically energized components of the engine or accessories of the engine. A relay 38 controls transfer of electrical energy from battery 36 to motor 20 and other energized devices in a manner that will be explained momentarily.

The various structural details of engine 10 and the components associated therewith thus far described are essentially conventional, well-known devices in the field of internal combustion engines. It is envisioned that the engine 10 will utilize a kerosene-based type fuel spanning JP5 to D2 fuels so that it can be utilized when gasoline is not available or when a single fuel is to be used for various engine applications as might be the case in a military environment.

As is well known, reciprocating piston, two-stroke engines burning kerosene type fuels are difficult to start without using a starting fuel composition that is more volatile than the standard kerosene type fuels or a heating system for vaporizing the fuel before it enters the combustion chamber of the engine. The present invention provides a unique fuel preheater system or combustion chamber heating arrangement that enables convenient startup of internal combustion engines using kerosene type fuels such as the one described above, particularly under low temperature operating conditions.

In accordance with one embodiment of the invention, at least a two stage fuel or charge heating arrangement is provided whereby liquid fuel is first vaporized or heated by a heating device associated with the fuel supply and/or the intake conduit and the charge formed with that fuel may also be heated in the combustion chamber of the engine by a heater other than a spark igniter. This embodiment of a fuel vaporizing and charge heating system is described as follows.

Figure 2:
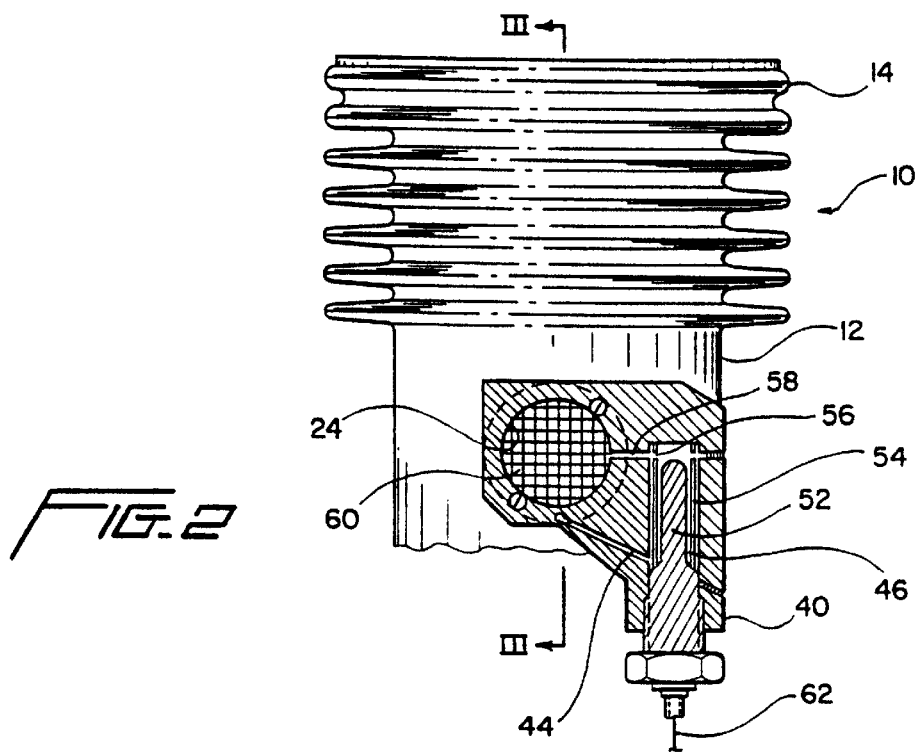
FIG. 2 is an elevational partial cross-sectional schematic view of the fuel vaporizing chamber in accordance with this invention, this view being taken along line II—II of FIG. 3.
Figure 3:
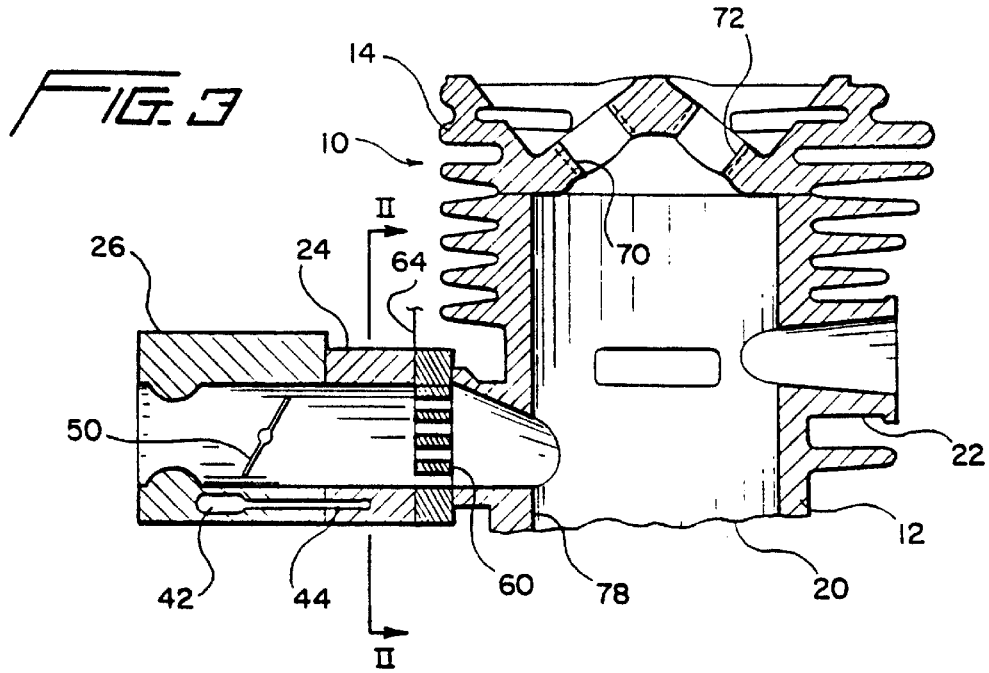
FIG. 3 is a transverse elevation cross-section view taken along line III—III in FIG. 2 and illustrates the charge heater element in accordance with this invention.

With reference to FIGS. 1–3, the carburetor 26 preferably will be selected so that it has a starting circuit that channels liquid fuel from a liquid fuel supply to the intake conduit downstream of a throttle valve in the intake conduit. Upon normal startup of the engine, liquid fuel is supplied through the starting circuit to provide fuel for combustion while the throttle valve is essentially closed or near closed. Of course, opening of the throttle valve would increase the flow of air through the intake conduit of the engine and fuel then would be supplied to the engine charge intake through normal aspiration of fuel with the air within the carburetor.

In this example of the invention, carburetor 26 would include a liquid fuel starting circuit that communicates with an appropriate port or conduit that channels liquid fuel to a fuel vaporizer device 40 that is illustrated in more detail in FIG. 2.

More specifically, as illustrated in FIG. 3, a carburetor 26 includes a liquid fuel containing chamber 42 and an idle or starting fuel conduit 44 ("idle circuit") that extends from chamber 42 to a vaporizing chamber 46 within vaporizer 40. The chamber 42 is in communication with a liquid fuel supply received from fuel line 48 that receives fuel from an appropriate fuel supply (not illustrated).

Carburetor 26 is only schematically illustrated and does not show the usual features associated with a carburetor device, including a float bowl, fuel level establishing elements, orifices, venturis and other means associated with carburetors for controlling flow of fuel into an intake conduit while air is moving through the conduit as a result of engine operation. However, a typical preferred carburetor to be selected for use with the present invention would include a fuel idle or starting circuit (like circuit 44) that would at least include a conduit for transferring liquid fuel to a position in the intake conduit downstream of a flow control or throttle valve such as illustrated at 50 in FIG. 3 or the equivalent. The throttle valve 50, as is customary with internal combustion engines, would be utilized to control the speed of engine 10 in accordance with power demands imposed on the engine.

As seen in FIG. 2, the conduit 44 extends into a vaporizing chamber 46 of vaporizer 40. A heating element 52 that preferably is electrically energized is disposed in the vaporizing chamber 46. Closely surrounding the upwardly extending heating element 52 is a thermally insulating wall 54 that includes an opening 56 at its upper end that communicates with a conduit 58 that in turn communicates with the interior of intake conduit 24.

Within intake conduit 24 just downstream of where conduit 58 intersects conduit 24 there is optionally provided a second heating element 60 that extends across the intake conduit 24 to heat the fuel and air (i.e., the charge) moving through intake conduit 24, including any fuel vaporized in chamber 46 by the heating element 52 and discharged through conduit 58.

Heating elements 52 and 60 in the illustrated examples are preferably energized electrically from any suitable source of electricity, for example, battery 36. Electrical lines 62 and 64 respectively connect electrical elements 52 and 60 to a source of electrical energy in a manner that will be described in more detail below.

The heating elements 52 and 60 may be of any type that can be selectively energized by an operator or energized automatically upon initiation of engine starting procedures to create or generate sufficient heat to vaporize liquid fuel used by the engine 10, in the case of heating element 52, or to heat the charge to a sufficient temperature to enable starting of the engine 10, in the case of heating element 60. By way of specific example, heating element 52 could be a conventional glow plug used for starting diesel engines, while heating element 60 may comprise a grid formed of ceramic having electrical resistivity that decreases as the temperature of the ceramic element increases upon electrical energization. That is, the ceramic material comprising heating element 60 would be a poor conductor that heats upon application of electrical energy thereto due to resistance of the material to the passage of electrical energy through the material but which, for example, maintains a predetermined temperature due to its decreased resistance to the flow of electrical current at a preselected temperature. Such ceramic materials are well known in so-called household ceramic heater devices.

Figure 4:
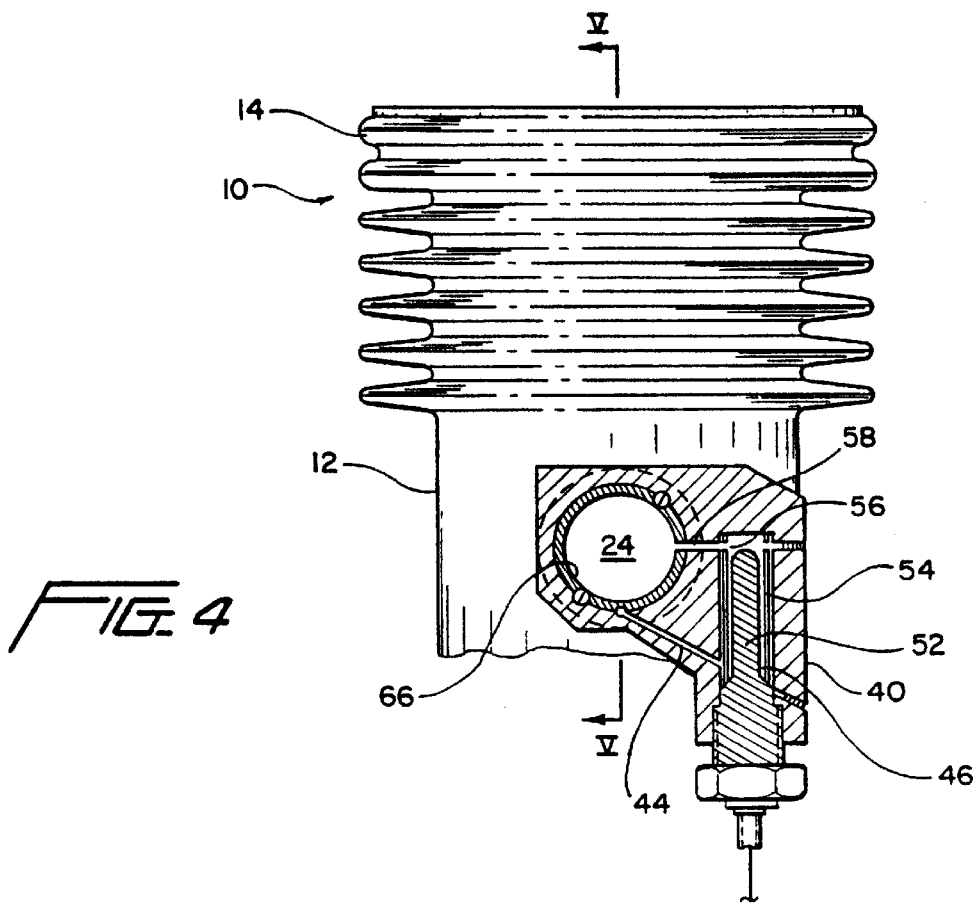
FIG. 4 shows an alternate embodiment of the device illustrated in FIG. 2 and is a partial section view taken along line IV—IV in FIG. 5.
Figure 5:
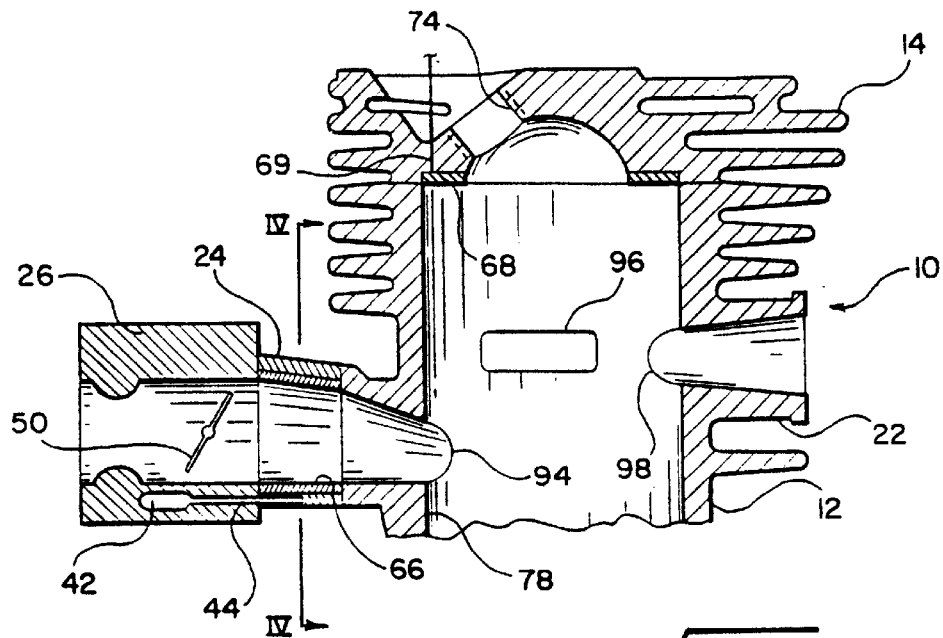
FIG. 5 shows an alternate embodiment of the invention illustrated in FIG. 4 taken along a section line V—V in FIG. 4.

In an alternate embodiment, heating element associated with the intake conduit optionally may comprise an annular sleeve 66 shown in FIGS. 4 and 5 wherein the sleeve is formed of the same material as heating element 60. It should be understood that, within the broadest scope of the invention, any appropriate heating element may be substituted for heating elements 52, 60 and 66, including electrical resistance elements, chemically heated elements, exothermic reaction elements, catalytic elements or the equivalent. However, novelty and uniqueness is believed to lie in the use of a ceramic heater of the type described.

As illustrated in FIG. 5, a heating element 68 may be provided to transfer heat into a charge admitted into the combustion chamber of engine 10. The heating element 68 likewise could be formed of an electrically heated ceramic or other material energized via line 69 or could simply be a heat retention element that retains heat between successive combustion cycles to a greater degree than the material forming the combustion chamber walls of the engine 10. For example, if the cylinder walls or head material was aluminum, the element 68 could be steel.

Still another alternative is illustrated in FIG. 1 wherein a glow plug 32 extending into the combustion chamber of engine 10 is provided as a charge preheater. The glow plug is not illustrated in FIG. 3, but would be connected to port 70 which would be suitably threaded, for example, to receive the glow plug. A spark plug or other conventional spark igniter 30 would be provided in threaded port 72. Suitable electrical leads would be connected to the glow plug 32 and spark igniter 30 in accordance with conventional technology. In the case of the embodiment shown in FIG. 5, of course, a glow plug would not be utilized in lieu of the use of the heating element 68 and a spark plug would be inserted in the port 74.

It should be understood that the various heating devices described above could be used in combination with one another or independently in any cold-starting system for an engine intended to use a kerosene type fuel. Preferably, at least two heating devices will be used in any cold starting system contemplated by this invention. Thus, a fuel vaporizer could be used in combination with either a grid or sleeve heater 60, 66 associated with the inlet conduit of the engine or in combination with a combustion chamber heater such as illustrated in FIGS. 5 and 7 of the drawings. Chemical heating arrangements for vaporizing the fuel and/or charge and the combustion chamber as described below likewise may be used in combination with any of the heaters thusfar described or alone. Thus, it is to be understood that any arrangement of fuel and/or charge preheater or combustion heater/preheater disclosed herein may be used alone or in combination with any other heating arrangement described herein depending upon the particular engine application to be adapted for cold starting conditions.

The invention contemplates a starting control system that is schematically illustrated as a control box 84 (FIG. 1) that could house a simple indicator and signal system or a microprocessor controlled engine starting arrangement. In the case of a simple signal system, an appropriate switch 86 is provided to initiate activation of any electrically activated heating element, such as elements 52, 60, 66, 32 or 68. If the elements are electrically energized, for example, an appropriate lead 88 is provided from battery 36 to control unit 84 and appropriate circuitry would be contained within the unit 84 to direct electrical energy to the electrical lines 62, 64, 33 and 69 (described below). If heating element 68 (FIG. 5) was electrically energized, an appropriate lead 69 would be provided between the element 68 and the control unit 84 to control energization of the element 68. Energization of the heating elements 52, 60 and 32 would continue until the availability of vaporized fuel in intake conduit 24 is assured. This can be accomplished by utilizing a simple timer in control unit 84 that activates the electrical heating elements for a preselected period of time that can be determined from experimentation and which will virtually always assure that vaporized fuel will be available in conduit 24. Upon expiration of the preselected time interval, an indicator lamp on control unit 84 could flash a signal to the operator of the engine to start the engine if it is a pull-start starter or to activate relay 38 to connect battery 36 to electrical starting motor 20 if the motor 20 is provided. In accordance with another mode of the invention, the control unit 84 could automatically activate relay 38 to connect battery 36 to starter motor 20 to automatically crank engine 10 after vaporized fuel is present in intake conduit 24.

If a microprocessor is utilized, operation of a starting mode sequence would be initiated by the operator, for example by activation of switch 86, following which the microprocessor would activate the glow plug 32 on the combustion chamber, activate the glow plug 52 in the vaporizer for a predetermined time and then activate starter motor 20 when appropriate signals were received by the microprocessor indicating dependable starting conditions. For this purpose, a temperature or vaporized fuel sensor 90 could be provided in intake conduit 24 (FIG. 1) and connected to control unit 84 via line 92 to provide the microprocessor with signals indicative of intake conduit temperature conditions or the presence of fuel vapor. As needed, the temperature of the cylinder head of the engine likewise could be provided by sensor 34 to the microprocessor in control unit 84, as shown, to enable the microprocessor to control engine idle if an automatic throttle control is utilized and controlled via lead 93. The vaporized fuel sensor 90 could also be used in a simple start indicator system, whereby the control unit 84 would receive signals from sensor 90 indicating the presence of fuel vapor in intake conduit 24 and provide an audible or visible start signal to the engine operator indicating that fuel conditions are correct for starting the engine.

Any suitable microprocessor could be utilized for this application and the programming required to initiate starting of engine 10 in response to the various signals inputted to the microprocessor would be well within the skill of a person knowledgeable in computer and engine technologies.

The control system 84 could be integrated with the ignition system controlling the operation of spark plug 30 or a simple magneto system could be utilized wherein operation of the engine creates spark energy via a suitable magneto (not illustrated) electrically connected to spark plug 30.

As noted previously, engine. 10 is contemplated as comprising a two-stroke cycle engine that utilizes a naturally aspirated carburetor arrangement 26 for charge preparation. A piston for use in such an engine is not illustrated in the embodiments illustrated in FIGS. 1–5, however, the piston normally would periodically cover and uncover inlet port 94, charge transfer port 96 and exhaust port 98, as will be clear from the description to follow regarding FIG. 6.

Figure 6:
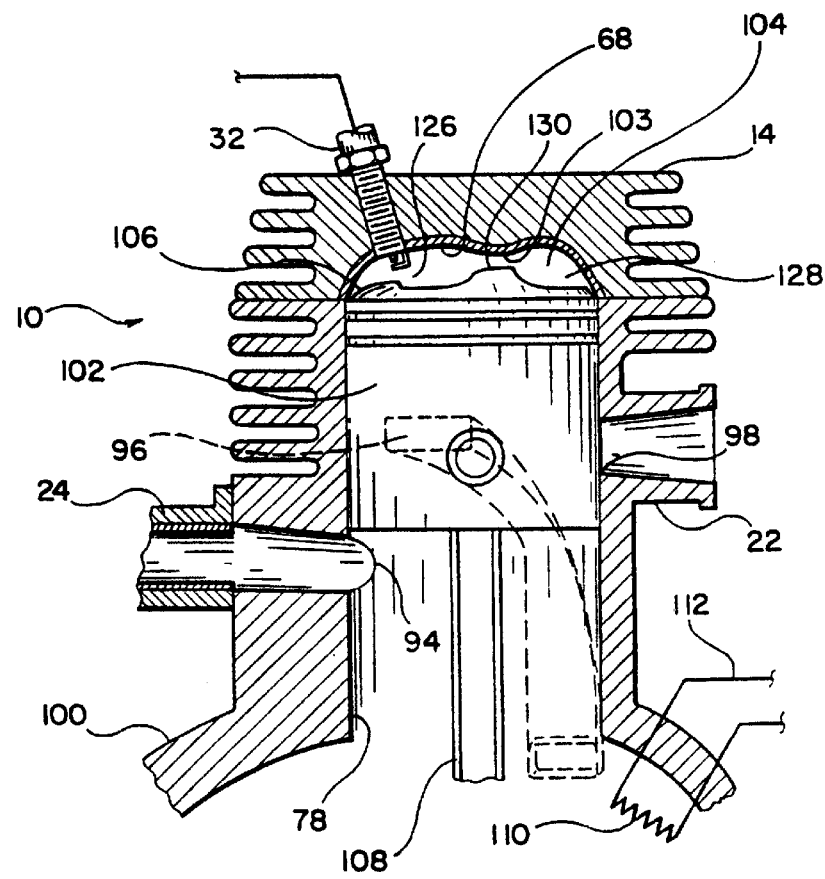
FIG. 6 shows an example of a combustion chamber configuration usable with the invention.

It is highly desirable to utilize a combustion chamber configuration that will enable the engine to run after starting without knock and with acceptable emissions. A combustion chamber geometry as illustrated in FIG. 6, including optional heat retainer or heating element 68, could be utilized in this regard. Such a combustion chamber geometry is illustrated in U.S. Pat. No. 4,788,942, which is incorporated herein by reference. Thus, the upper end of piston 102 attached to connecting rod 108 extending into crankcase 100 is essentially contoured so that at the piston TDC position, combustion chamber 104 is effectively divided into two chambers 126, 128 by a ridge or raised portion 130 at the upper end of piston 102 and/or a protrusion 103 in the cylinder head. A spark device 132 extends into main combustion chamber 126 where ignition of each charge is initiated during each combustion cycle. The gap that exists between the ridge 130 of piston 102 and the closed end of cylinder 78 (or protrusion 103) is selected in accordance with principles described in U.S. Pat. No. 4,788,942 whereby chamber 128 constitutes a resonating chamber separated from main ignition chamber 126 by a restricted passageway defined by the gap between the closed end of cylinder 78 and the ridge or projection 130 of piston 102. The resonating chamber 128 effectively exists only at and near the Top Dead Center (TDC) position of piston 102 but this time is of sufficient duration so that the beneficial effects of the resonating chamber 104 as described in U.S. Pat. No. 4,788,942 are obtained.

As further described in that patent, at the moment of ignition substantially all of the fuel of each charge is contained within the ignition chamber 126 while resonating chamber 128 contains insufficient fuel for combustion or substantially no fuel. Upon ignition, resonance induced in chamber 128 by combustion wave energy creates an air pump effect whereby air contained within chamber 128 is pumped into the ignition chamber 126 even though the instantaneous average pressure within chamber 126 may be higher than the average instantaneous pressure within chamber 128, all as described in U.S. Pat. No. 4,788,942. Reference should be made to the aforementioned patent for a further description of the operation of combustion chamber 104.

In the embodiment of FIG. 6, a crank case heater 110 optionally may be provided to preheat the charge drawn in through inlet port 94 during cold startup of the engine. Appropriate electric leads 112 would be provided to supply electrical energy to the heater 110.

The engine configuration illustrated in FIG. 6, of course, is a typical arrangement for a two-stroke, spark ignited engine wherein reciprocation of piston 102 within cylinder 78 causes cyclic variation in pressure within crank case 100 as the piston cyclically covers and uncovers the intake port 94, charge transfer port 96 and exhaust port 98. As piston 102 moves downwardly in cylinder 78, it creates a vacuum in the combustion chamber 104 and a pressure within crankcase 100. During the preceding upward stroke of piston 102, a charge has been admitted into the crankcase through intake port 94 which could have been preheated by any one or more of preheater elements 52 (FIG. 2), 60 (FIG. 2), 66 (FIG. 5) or a chemical preheater to be described below. As the piston drops below the charge transfer port 96, the charge in crankcase 100 is drawn or pumped up into the combustion chamber area above piston 102 via the charge transfer port. Upward movement of piston 102 then compresses the charge between the top of the piston and the head 14 that closes the cylinder 78. Optionally, heater 68, if electrically activated, could be activated at any time to preheat the combustion chamber in accordance with the embodiment described above in connection with FIG. 5. Upon the next stroke downwardly of piston 102, exhaust port 98 typically is uncovered first and immediately thereafter charge transfer port 96 is opened to initiate the next cycle.

Another embodiment of the invention is illustrated in FIGS. 7 and 8 wherein an air cooled, piston type, two stroke, spark ignited internal combustion engine 140 is schematically illustrated. Engine 140 includes a cylinder 140 within which a piston (not illustrated) reciprocates to periodically expose intake port 144, charge transfer port 96 and exhaust port 146 to cyclically admit charge to the cylinder 142 and to exhaust combustion products through exhaust port 146. A carburetor or other suitable charge preparation device 148 includes a throttle valve 150 or the equivalent for regulating flow of air (and aspirated fuel) through intake conduit 152 in the same manner as the engine illustrated in FIG. 1. Like the FIG. 1 embodiment, carburetor 148 includes an idle or starting circuit including a chamber 154 to which liquid fuel is supplied and a fuel conduit 156 that corresponds to conduit 44 in FIG. 3. The fuel vaporizer corresponding to vaporizer 40 in FIG. 1 is not illustrated in FIG. 7 but such a vaporizer may be provided in this embodiment and would include a vaporized fuel conduit corresponding to conduit 58 in FIG. 4 that communicates with the fuel intake conduit 152 within or closely adjacent to the optional heater device or element 160 that corresponds to the annular heater element 66 illustrated in the embodiment shown in FIG. 5.

Another heater element shown in the embodiment shown in FIG. 7 useful in combination with the fuel vaporizer or alone is a heat retaining element 162 installed at the closed end of cylinder 142 adjacent spark electrodes 164 of spark plug 166.

Heat retaining element 162 in accordance with this embodiment is circular in configuration to fit within the upper end of cylinder 142 and is shown in plan view along line VIII—VIII in FIG. 8.

Heat retaining element 162 preferably is formed of a material having relatively lower thermal conductivity than the thermal conductivity of the combustion chamber wall material, in particular the cylinder wall and head material, of engine 140. The concept underlying the heat retention element 162 is to provide an insert or permanent fixture within the combustion chamber of engine 140 that will retain heat of combustion between combustion cycles. Thus, heat retention element 162 could be formed of steel or ceramic if the cylinder walls and/or head of engine 140 were formed from, for example, aluminum. Such a heat retention element would be heated by the first few combustion cycles and would thereafter stay in a highly heated state from one combustion cycle to the next for the purpose of assisting in vaporization of the low volatility kerosene based fuels that are contemplated for use with engine 140.

The element 162 is shaped so as to define one or more chambers 168 that extend generally circumferentially within the combustion chamber of engine 140 adjacent the spark electrodes 164 of spark plug 166. The chambers 168 are in communication with the main combustion chamber via restricted openings 170 between chambers 168 and the interior volume of cylinder 142 above the piston of the engine. The chambers 168 will receive the compressed charge received through intake port 144 and compressed by the piston of the engine and further compressed by combustion in combustion chamber 168, and, upon combustion in chamber 168, will expel pressurized gases from chambers 168 through gap 170 into the main combustion chamber due to more rapid expansion of combustion gases in chamber 168 as the piston is receding from its TDC position. The high velocity expulsion of gases from chambers 168 will be directed by the restricted openings 170 across the spark electrodes 164 to keep the spark electrodes clean.

It is believed that the heat retention element 162, the chambers 168 and the restricted openings 170 all combine to produce a beneficial effect in reducing engine knock and fouled spark plugs in an engine of the type illustrated in FIG. 7.

It will be noted from FIG. 8 that the restricted openings 170 extend substantially across the width of element 162 a distance that corresponds substantially with the circumferential length of chambers 168 so as to provide good continuous communication between the chambers 168 and the main combustion chamber. In FIG. 8, area 170a is depressed from the plane of the remaining portion of element 162 so as to provide a restricted opening 170 when the heat retaining element 162 is placed in engine 140 as illustrated in FIG. 7. The openings 170 also are configured to quench any flame front that may impinge the openings from the combustion chamber.

It is believed that the minimum volume of a chamber 168 associated with a heat retaining element 62 should be approximately 5% of the top dead center volume of the combustion chamber with the height of the restricted opening 170 between the closed end of the cylinder and the surface 170a being approximately 0.005–0.020 in (0.127–0.508 mm). However, it is also contemplated that two chambers 168 such as illustrated in FIG. 8 could be utilized wherein the volume of the chambers 168 amounts to approximately 12% of the TDC volume of the combustion chamber of engine 140. A suitable range of volumes for chamber(s) 168 would be from 5% to 20% of the volume of the TDC volume of the combustion chamber.

Another embodiment of the invention is illustrated in FIG. 9, wherein a piston type, spark ignited, two stroke, air cooled internal combustion engine is fuel injected at the intake port position or in the fuel intake conduit. In accordance with the embodiment of FIG. 9, engine 174 includes an intake conduit 176 and an exhaust conduit 178 and a spark plug 180. The piston (not illustrated) reciprocates within the engine 174 to drive output shaft 182 in a conventional manner. A fuel injector 184 connected to a fuel rail or other source of liquid fuel under pressure is schematically illustrated and is connected to intake conduit 176 so as to provide fuel to the air drawn by the engine through intake conduit 176. The fuel injector 184, of course, prepares a suitable charge to be admitted through the intake valve of engine 174.

A fuel vaporizer 188 similar to vaporizer 40 is provided in secondary intake conduit 192 for cold starting the engine.

A control valve 194 in the primary intake conduit 176 may be used in conjunction with an air flow control valve 196 in the secondary conduit 192 so that, upon startup, the fuel injector may be inactivated, if desired, while fuel is supplied from fuel vaporizer 188 with valve 196 open to supply starting charge to engine 174. Upon startup, a selection could be made between fuel supplied through injector 184 and secondary fuel from vaporizer 188 or the total fuel supply could be made through the fuel injector 184. In effect, it will be observed that the secondary air flow conduit 192 in effect is a starting circuit for engine 174 to provide vaporized fuel to enable starting of the engine that otherwise would be fuel injected during normal operation. Such a starting circuit could be utilized irrespective of the specific fuel injection arrangement associated with engine 174. For example, a similar starting circuit could be utilized in an engine that is directly fuel injected into the combustion chamber. Of course, any secondary charge/combustion chamber heating system disclosed herein could be used if desired in combination with the fuel vaporizer 188.

In addition, the embodiment of the engine in FIG. 9 could include a heating element in the combustion chamber similar to the heating element 68 in FIG. 5 or a chemical preheater as described in connection with FIG. 10 below. The charge preheater 190 moreover could also comprise a chemical preheater of the type illustrated in connection with FIG. 12 also described below. The heating element corresponding to heating element 162 illustrated in FIG. 7 likewise could be incorporated in the engine shown in FIG. 9 if desired.

Figure 10:
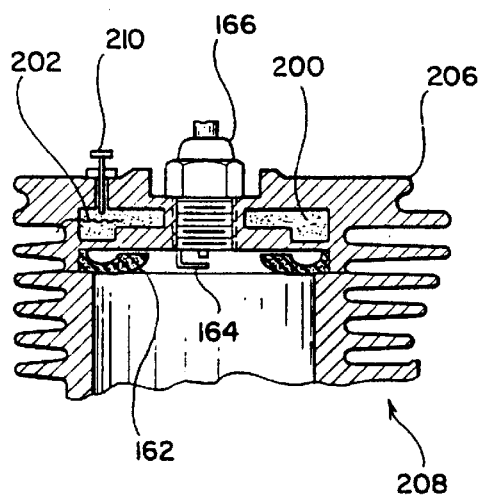
FIG. 10 shows another embodiment of the invention illustrating the use of a chemical preheater arrangement.
Figure 11:
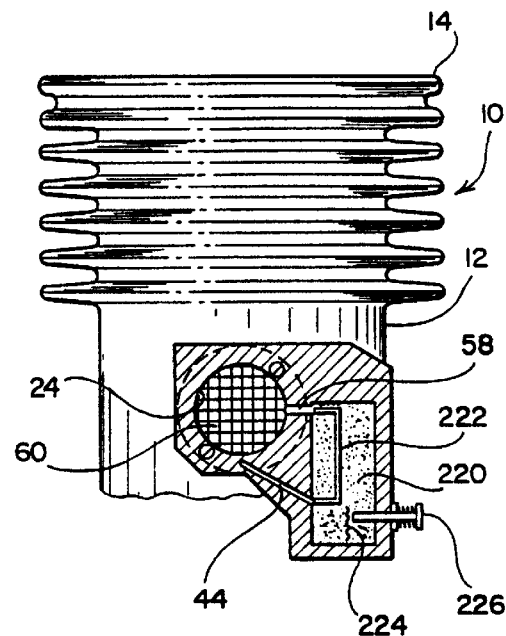
FIG. 11 shows still another embodiment of the invention using a chemical preheater arrangement in the fuel delivery circuit.

FIGS. 10 and 11 show additional embodiments of the invention wherein recyclable chemical type heaters may be utilized to preheat fuel supplied to the combustion chamber or the combustion chamber itself of an engine. As illustrated in FIG. 10, a chemical preheater 200 including an activator 202 is provided in the head 206 of engine 208. A spark plug 166 including electrode 164 is also provided in the same manner as the embodiment of FIG. 7, and a heat retainer 162 may optionally be provided in this embodiment if desired. A manual actuator 210 for actuating activator 202 or any other suitable arrangement to actuate activator 202 may be provided, the only required characteristic being enablement of the activation process to initiate the exothermic chemical reaction in the chemical heater.

The chemical heater 200 may comprise any suitable chemical heater known in the art, but preferably a manually operable chemical heater is preferred. Typically, the preheater 200 comprises a super-cooled aqueous salt solution such as sodium acetate tetrahydrate that causes generation of heat through precipitation of solute upon activation of an activator 202 that typically comprises a thin flexible metal sheet that, when flexed, produces minute metal particles or other sources of precipitation that initiate an exothermic precipitation reaction, (i.e., giving up of latent heat of transition) in the material of the preheater 200. A typical heat pack disclosed in the prior art is described in U.S. Pat. Nos. 4,872,442 and 5,058,563. A preheater such as the chemical preheater illustrated in FIG. 10 could be used in lieu of heater elements 68 and 162 illustrated in FIGS. 5 and 6 or in combination with such heater elements. The chemical heaters described herein typically would be recycled by heating the solution (now with precipitate) using the heat of the engine itself to raise the temperature of the chemical material sufficient to resolubilize the solution and to enable re-use of the heater after cooling.

An alternate embodiment of a chemical preheater used in a fuel intake to vaporize the fuel upon cold starting of an engine 10 is illustrated in FIG. 11, wherein a chemical preheater 220 is utilized to heat fuel in an idle/starting circuit conduit 222 that is in communication with conduits 44 and 58 as described earlier in connection with the embodiments of FIGS. 1 and 2. In the example of FIG. 11, an activator 224 may be actuated manually by actuator 226 or the equivalent to cause activation of the chemical heater 220 in accordance with known principles, for example as described in connection with FIG. 10 above. Upon activation of the chemical heater 220, the fuel in the starter circuit 44, 222 and 58 would be heated and vaporized to permit starting of the engine 10. The chemical heater 220 may be used alone or in combination with any other fuel, charge, or combustion chamber described herein.

Figure 12:
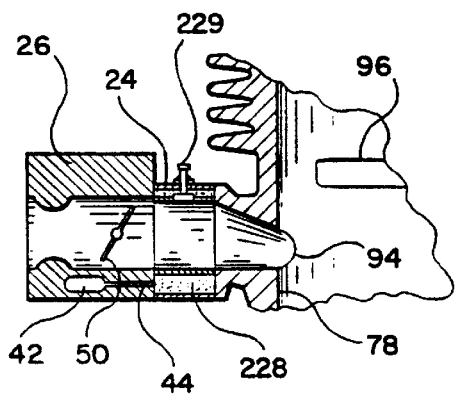
FIG. 12 shows another embodiment of the invention using a chemical preheater in the intake manifold of the engine.

Another embodiment of the invention is illustrated in FIG. 12, wherein a chemical preheater 228 and an associated actuator/activator 229 is provided in the intake conduit 24 of the engine to preheat a charge in a manner similar to the preheater 66 illustrated in FIG. 5. The chemical preheater 228 could be utilized alone or in combination with any of the other various preheaters and combustion chamber heaters described herein.

Figure 13:
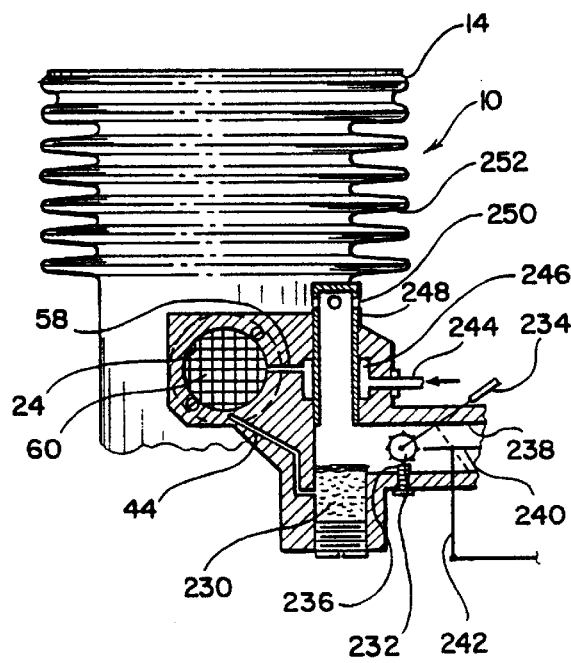
FIG. 13 shows another embodiment of a fuel preheater arrangement utilizing an open combustion arrangement for fuel preheating.

Still another embodiment of a fuel vaporizer useable in connection with engine 10 is shown in FIG. 13 and comprises an open combustion system constructed along principles similar to a liquid fuel cigarette lighter. In accordance with FIG. 12, fuel from starting circuit conduit 44 is admitted to a wicking material 230 to impregnate this material. At a suitable time, a striker wheel 232 is manually rotated through an appropriate lever or knob 234 to throw sparks from the flint 236 against wick 230 that is now impregnated with fuel or ignition is caused by any other suitable device. Air to support combustion of fuel in wick 230 is provided through air conduit 238 that also contains a rotatable valve 240 or equivalent operated through a suitable mechanism 242 so that, in this example when the choke (not shown) in the main carburetor of engine 10 is closed, the throttle valve 240 is open, and vice versa. Fuel from the starting circuit of the main carburetor of engine 10 may be supplied through a separate conduit 244 or via conduit 44 to fill chamber 246 with liquid fuel before ignition of the fuel soaked wicking material 230.

Upon ignition of fuel in wick 230, combustion will occur at the top of wick 230 creating hot combustion products that will move upwardly through chimney or conduit 248 and exit through apertures 250 adjacent and beneath the cooling fins 252 of the engine. Thus, the heated gas created by combustion of fuel in wick 230 will heat the fuel in chamber 246 and will also heat an area of the fins 250 adjacent the exit ports 250 for the combustion products in chimney 248. Of course, the material of chimney 248 would be selected to ensure good heat conductivity into the fuel contained within chamber 246. The fuel vaporized in chamber 246 will then proceed into the intake manifold of engine 10 via conduit 58 in the same manner as described previously in connection with the embodiments of FIGS. 1–5 described previously.

As an alternative, a catalytic combuster element (not shown) can be used instead of open flame wick 230 to avoid an open flame condition. The catalytic combuster element would be activated by any suitable means, including the spark igniter.

The open flame preheater illustrated in FIG. 12 may be used with or without any of the secondary or third heaters disclosed herein. In all embodiments of the invention, it is preferred to use at least a two-stage preheater arrangement to at least vaporize liquid fuel upon cold starting an engine when using a kerosene type fuel. The specific arrangement of the heating elements will depend upon the specific applications of any engine, in particular the coldest temperatures expected to be encountered during the operation of such engines and the type of fuel used with the engines.

FIG. 14 shows still another embodiment of the invention. Specifically, an engine 260 includes a domed combustion chamber 262, a piston 264 reciprocating in cylinder 266; and cylinder head 268 closing the upper end of cylinder 266 to provide a combustion chamber 262.

Engine 260 is shown as a direct injected engine in which fuel is admitted through fuel injector 276 which is connected to an appropriate fuel injector pump (not illustrated) for supplying fuel directly to the combustion chamber 262 in accordance with known fuel injection principles. A spark plug 278 connected to a suitable ignition source provides spark energization for initiating combustion of a charge in the combustion chamber 262. Optionally, a heater or heat retainer 282 may be provided along the inner wall of the upper end of the combustion chamber 262. The heater or heat retaining element 282, if provided, would correspond to the heater or heat retainer element 68 as illustrated in FIG. 5.

The embodiment of FIG. 13 is illustrated as using valved inlet and exhaust ports 284, 286, operable through well known valve operating devices and wherein the inlet port 284 would be in communication with a carburetor or other charge preparation device that could be provided with any of the fuel preheaters described herein, if desired. Optionally, the valves 284, 286 could be eliminated in favor of other means for delivering air to the combustion chamber 262 in periodic timing with reciprocation of piston 264, for example, an air transfer port similar to charge transfer port 96 of FIGS. 5, 6 operating in synchronization with piston 264.

Blowing chambers 288 are provided in the head 268 of engine 260 and communicate with combustion chamber 262 through restricted apertures 290 that are configured to correspond with the restricted openings 170 associated with heat retainer 162 illustrated in FIG. 7. That is, the restricted openings would be dimensioned so as to have a maximum cross-sectional dimension on the order of 0.005–0.020 inch (0.127–0.508 mm) and would quench any flame front moving from the combustion chamber towards the chambers 288. The apertures 290 are aimed towards the electrodes 279 of spark plug 278 to direct gases expanding out of chambers 288 in a direction calculated to maintain the electrodes clean during operation of the engine.

Operation of the embodiment of the invention illustrated in FIG. 14 will now be described. The downward stroke of piston 264 draws air through inlet valve 284 (or an appropriate air transfer port if air is pumped into the combustion chamber through the crankcase of the engine or by other means). An appropriate preheater for the air similar to the heaters 60, 66, 160, 228, illustrated in FIGS. 2, 4, 7 and 12 may be used to preheat the combustion air if desired. On the next upward stroke the air is compressed and at the appropriate moment fuel is injected through injector 276 directly into the combustion chamber. A portion of the fuel air charge is compressed into the blowing chambers 288 and at the appropriate time the charge in the combustion chamber 262 is ignited by the spark plug 278. Prior to ignition, the heating material 282 may be activated to heat the combustion chamber during a cold start of the engine or a glow plug could be utilized gi electrical energy is available. If the material of the heater 282 is a thermal regenerator, that is, a material that retains heat within the combustion chamber from cycle-to-cycle as shown at 162 (FIG. 7), then it will become operative after the first few combustion cycles of the engine.

During the power stroke of the piston 264, the combustion chamber 262 will expand as the piston 264 is driven downwardly by increasing pressure in the combustion chamber. Upon the pressure dropping in the combustion chamber due to expansion and cooling of combustion products, the chambers 288 will evacuate into the combustion chamber and the highly compressed gases therein will be discharged directly as high speed jets against the electrode 279 of the spark plug 278 to maintain the electrode in clean condition. This is particularly useful when using fuels such as kerosene based fuels which tend to foul a spark plug in a spark ignited engine using such fuels.

Near the end of the power stroke, the exhaust valve (or port) is opened and the intake valve is opened to admit fresh charge as the combustion products from the previous cycle are exhausted.

While the engine is described in connection with a two stroke cycle process in FIG. 14, it will be evident that the arrangement could work as well with a four stroke engine. The chambers 288 may be a single continuous chamber or may big divided into multiple chambers as illustrated. The exhaust valve 286 may be substituted by an exhaust port normally covered by the piston as the piston approaches its bottom dead center (BDC) position. A reed valve system likewise may be utilized as shown in a two cycle engine of the type illustrated in FIG. 13 which may function in combination with appropriate charge transfer ports or be provided in association with conduits or ports directly communicating with the combustion chamber 262.

It is to be understood that the foregoing description of the various embodiments of the invention are provided for illustrative purposes only and that other embodiments and equivalents of the invention could be constructed in accordance with the teachings herein without departing from the spirit and scope of the inventive concepts described. Accordingly, the invention is to be limited only by the scope and content of the claims appended hereto.

We claim:

1. In a reciprocating piston type internal combustion spark-ignited engine including a charge intake conduit; at least one variable volume combustion chamber in communication with the charge intake conduit; said at least one combustion chamber defined by a cylinder end wall, cylinder side walls and a reciprocating piston; a liquid fuel supply; a charge preparation device connected to the intake conduit for receiving liquid fuel from the liquid fuel supply and supplying the fuel to air flowing in the intake conduit to form a charge; a spark igniter in the combustion chamber and a flow control valve in the intake conduit, the improvement comprising:

a first heating device other than the spark igniter arranged to heat and vaporize at least fuel of the first charge supplied to the combustion chamber before its ignition in the combustion chamber; and a second heating device other than the combustion chamber walls, the piston and the spark igniter, and second heating device being located in the combustion chamber and arranged to add heat to each charge supplied to the combustion chamber after ignition of the first charge.

2. A piston type international combustion engine as claimed in claim 1, wherein said first heating device comprises an electrically energized glow plug located in the engine combustion chamber.

3. A piston type internal combustion engine as claimed in claim 1, wherein said first heating device is a fuel vaporizer in the intake conduit arranged to vaporize fuel from the fuel supply before starting of the engine, and further comprising an electrical starting system for said engine and a fuel vapor sensing device connected to the intake conduit so as to sense vaporized fuel in the intake conduit and to generate an engine start signal responsive to the sensing by said fuel vapor sensing device of fuel in said intake conduit and further arranged to cooperate with the engine starting system so that said starting signal is transmitted to the starting system when fuel vapor is sensed in the intake conduit.

4. A piston type internal combustion engine as claimed in claim 1, wherein the second heating device comprises a heat retaining device adjacent the cylinder end wall formed of heat retaining material that retains combustion heat from one combustion cycle to the next to a greater degree than the cylinder wall said piston materials defining the combustion chamber.

5. A piston type internal combustion engine as claimed in claim 4, wherein said heat retaining device defines at least one secondary chamber that communicates with the combustion chamber through a restricted opening.

6. A piston type internal combustion engine as claimed in claim 5, wherein the volume of the combustion chamber at the top dead center (TDC) position of the piston is V and the volume of said at least one secondary chamber is about 0.05 to 0.20 V;

the secondary chamber comprises a chamber extending circumferentially of the cylinder side walls over a circumferential length, and said restricted opening has a circumferential length approximately equal to the circumference length of the circumferentially extending chamber; and the height of the restricted opening parallel to the cylinder side wall is approximately 0.005–0.020 in. (0.127–0.508 mm).

7. A piston type internal combustion engine as claimed in claim 5, wherein said restricted opening is arranged to direct flow of expanding combustion gases outwardly from the said at least one secondary chamber or chambers towards the spark igniter following ignition of each charge in the combustion chamber.

8. An internal combustion engine as claimed in claim 1, wherein said first heating device is an electrically actuated fuel vaporizer in the intake conduit arranged to vaporize fuel from the fuel supply before starting of the engine; an electrical battery power supply for the engine; an electrical starter motor for the engine and starting circuitry enabling connection of the battery to the starter motor to energize the starter motor; an automatic engine starting control system including a vaporized fuel sensor connected to the intake conduit for sensing the presence of vaporized fuel in the intake conduit and having a system for generating a vaporized fuel signal; conductive leads connecting the battery to the fuel vaporizer; a manually operable switch device arranged to generate an engine starting signal; a microprocessor arranged and programmed to receive at least the engine starting signal and said vaporized fuel signal, and to output a starter motor engage signal in accordance with the microprocessor program for activating the starting circuit to connect the battery to the starter motor.

9. A method of conditioning liquid diesel fuel and air charges supplied to the combustion chamber of a spark ignited internal combustion reciprocating piston engine to enable starting and running of the engine comprising the steps of:

supplying a first charge of diesel fuel and air to the combustion chamber and heating the charge by a heater other than the spark igniter;

heating the subsequent charges supplied to the combustion chamber by a second heater other than the spark igniter, and the combustion chamber walls or said second heater being located in the engine combustion chamber.

10. A method of preventing spark plug fouling in a diesel fueled, spark-ignited reciprocating piston type internal combustion engine including a spark plug igniter, comprising the steps of:

cyclically supplying to and igniting a charge of vaporized diesel fuel and air in the combustion chamber of the engine to create expanding combustion gases driving the engine piston over a power and expanding stroke each combustion cycle;

while operating the engine, compressing a minor portion of each supplied charge into a secondary chamber defined by secondary chamber walls adjacent the combustion chamber and communicating with the combustion chamber through a restricted opening configured so that the opening forms and directs jets of combustion gases expanding from the secondary chamber towards the electrodes of the engine spark plug igniter during each power and expanding stroke of the piston; and discharging the jets of expanding gases from the secondary chambers towards the engine spark plug igniter electrodes each engine combustion cycle during the power and expanding stroke of the piston.

* * * * *

UNITED STATES PATENT AND TRADEMARK OFFICE
CERTIFICATE OF CORRECTION

PATENT NO. : 5,855,192
DATED : January 5, 1999
INVENTOR(S) : McCowan et al.

It is certified that error appears in the above-identified patent and that said Letters Patent is hereby corrected as shown below:

Column 14,
Line 4, delete "and" insert -- said --.

Column 15,
Line 17, delete "and";
Line 17, after "or" insert -- piston, --.

Column 16,
Line 20, before "." insert -- ; and further including the step of maintaining the temperature of at least some of the walls defining the secondary combustion chamber higher than the temperature of walls defining the adjacent combustion chamber --.

Signed and Sealed this

Eighteenth Day of March, 2003

JAMES E. ROGAN
*Director of the United States Patent and Trademark Office*